Nov. 12, 1929.  T. RIVINIUS  1,735,585
WASTE ELEVATOR
Filed April 11, 1927
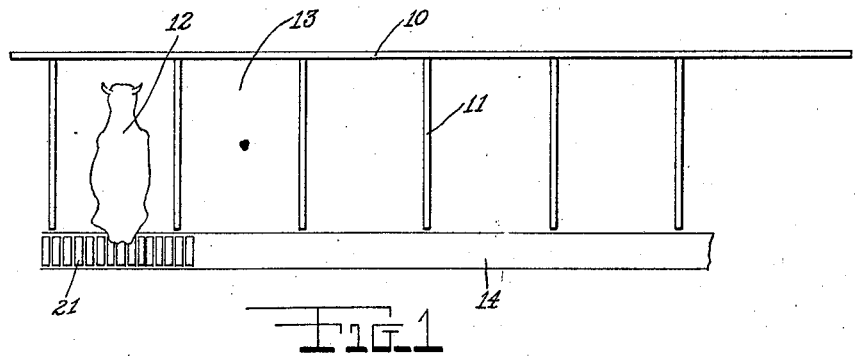
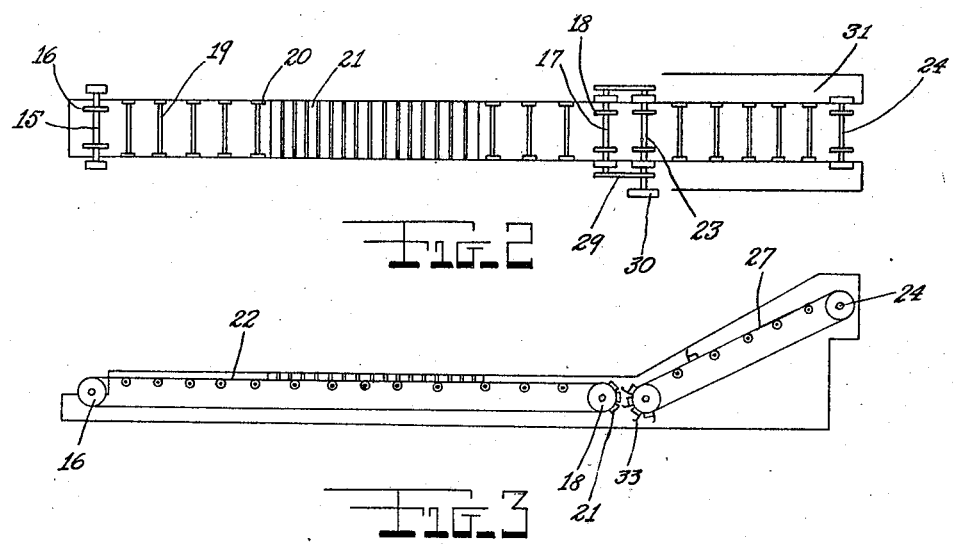
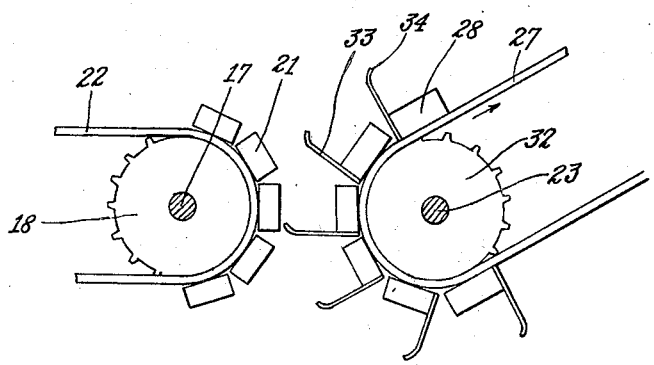
INVENTOR
*T. Rivinius*
BY
ATTORNEY Patented Nov. 12, 1929

1,735,585

UNITED STATES PATENT OFFICE

THEODORE RIVINIUS, OF ELGIN, NORTH DAKOTA

WASTE ELEVATOR

Application filed April 11, 1927. Serial No. 182,610.

The main object of this invention is to provide a conveyor which is adapted to be mounted in a trough at the open end of stalls to convey the manure from the animals to a position where it can be disposed of.

The above and other objects will become apparent in the description below, in which characters of reference refer to like-named parts in the drawing.

Referring briefly to the drawing, Figure 1 is a top plan view of a section of stalls, showing a portion of the conveyor mounted in a trough.

Figure 2 is a top plan view of the conveyor units with the belt removed from parts thereof.

Figure 3 is a side elevational view of Figure 2.

Figure 4 is an enlarged elevational view, showing the method of transferring the refuse from one conveyor to an inclined loading conveyor.

Referring in detail to the drawing, the numeral 10 indicates the wall of a barn or cattle house. At right angles to this wall, a plurality of dividing walls 11 are formed with spaces in between them in which the cattle 12 are housed. At the open end of the stalls 13, a trough 14 is formed in which the conveyor mechanism extends. This conveyor mechanism consists of a shaft 15 having sprocket wheels 16, the shaft being mounted at one end of the trough. Intermediate the length of the trough, a similar shaft 17 is formed which is also provided with sprocket wheels 18. Between these shafts 15 and 17, a plurality of spindles 19 have their ends embedded in the walls bounding the trough and on these spindles, disks 20 are rotatably mounted and support a conveyor belt consisting of transverse extending slats 21 which are mounted and fixed to an endless chain 22. These slats are rectangular and longitudinal pieces of wood and extend in a horizontal direction, the surface of the slats being flush or level with the surface of the floor of the barn. Adjacent the shaft 17, an additional shaft 23 is rotatably mounted and is also provided with sprocket wheels. This shaft cooperates with an additional shaft 24 provided with sprockets also in serving as a mounting for an endless sprocket chain 25 on which slats 28 are mounted. The shafts 17 and 23 are provided with driving sprocket wheels around which an endless chain 29 encircles. The shaft 23 at one end has a driving pulley 30 fixed thereto which is rotated by some source of energy not shown. The shaft 24 is mounted upon ridges 31 on a plane above that of the shafts 23, 17, and 15, and serves to incline the conveyor chain 27 on which the loading conveyor slats 28 are mounted. Sprocket wheels 32 are mounted on the shaft 23 and support the lower end of the chain 27. The slats 28, which are connected to the chains 27 of the loading conveyor, are provided with barrier plates 33 which have curved ends. The distance between the shafts 17 and 23 provides a space between the mutually adjacent ends of the conveyors, and in transferring the manure from one conveyor to the loading conveyor, the refuse would fall from the end of the horizontal conveyor into the trough were not the barrier plates provided. The slats 28, to which the barrier plates are attached, rotate in the same direction as the adjacent conveyor slats 21, and when the slats 21 maneuver a turn around the sprocket wheels 18 on the shaft 17, the refuse on these slats will be precipitated and fall upon the barrier plates 33 which haul said refuse upon the slats 28 and transport the same from the lower end of the loading conveyor to its upper end, where it may be disposed of into a wagon or similar vehicle.

I claim:—

In a manure lifter, a horizontal conveyor mounted in a trough, an inclined conveyor adjacent said horizontal conveyor, the mutually adjacent ends of said conveyors being spaced-apart, barrier plates for loading refuse from the horizontal conveyor to the inclined conveyor to lift the refuse to a higher level, slats arranged side by side on said inclined conveyor having relatively narrow spaces therebetween, the loading conveyor having its slats provided with said barrier plates, the sides of said slats having said barrier plates mounted thereon, said barrier plates filling the spaces between said slats on said loading conveyor, said barrier plates being curved in the direction of rotation of said conveyor at their outer ends.

In testimony whereof I affix my signature.

THEODORE RIVINIUS.